Dec. 7, 1965    D. L. OLSON    3,222,092

CABLE ANCHOR

Filed March 4, 1964

INVENTOR.
DELWYN L. OLSON
BY Charles Marks
ATTORNEY

United States Patent Office 3,222,092
Patented Dec. 7, 1965

3,222,092
CABLE ANCHOR
Delwyn L. Olson, Newton, N.J., assignor to Fluid Dynamics Incorporated, a corporation of New York
Filed Mar. 4, 1964, Ser. No. 349,446
3 Claims. (Cl. 285—114)

This invention relates generally to flexible, high pressure hose wherein an axial cable is employed as a tension member and is particularly concerned with an improved anchor for such a cable.

High pressure hose, wherein an axial cable is employed, has heretofore been developed in forms such as that disclosed in United States Patent No. 2,707,972 granted to H. W. Cole, Jr., et al. In hose of this type, the axial cable is usually anchored at each end of the hose by a radial member which grips the cable and is supported on a suitable shoulder formed upon the internal periphery of the hose. However, it has been found that conventional forms of such radial members are characterized by cross-sectional areas which substantially interfere with fluid flow through the hose. Moreover, in hose which is subjected to very high pressures, the depth of the aforesaid supporting shoulder is often so great as to restrict further the available cross-sectional flow area.

The present invention is concerned with the solution of these problems.

Accordingly, it is an object of the present invention to provide an improved means for anchoring a cable of the character described so as to provide a minimum of interference with fluid flow through the hose in which such cable is employed.

Another object of the invention is to provide an improved anchoring means for gripping such a cable, which anchoring means can be seated upon a supporting shoulder of minimum depth.

Another object of the present invention is to provide an anchoring means of the character described which has an improved capacity for gripping the internal periphery of the cable.

A further object of the present invention is to provide an economical and sturdy construction for the aforesaid anchoring means.

Other objects and advantages of the present invention will become apparent from the following description as read in connection with the accompanying drawing.

In the drawing.

Throughout the various views, similar numerals are employed to refer to similar parts of the illustrated form of the invention.

The present invention comprises an axial member such as is commonly subjected to tension arising from high pressures within flexible metal hose. In conventional hose of this kind, such an axial member is often anchored within a fitting upon which the hose is mounted. In the present invention, the anchor means is formed in a manner such that tension exerted on the axial member induces the anchor means to grip the internal periphery of the fitting and the surface of the axial member, thereby resisting such tension. This action results in a highly efficient utilization of the material of which the anchor means is composed and thus reduces its bulk so as to permit minimal interference with fluid flow through the hose and its aforesaid fitting.

The invention may be better understood from the following discussion of the embodiment thereof depicted in the accompanying drawing.

Figure 1:
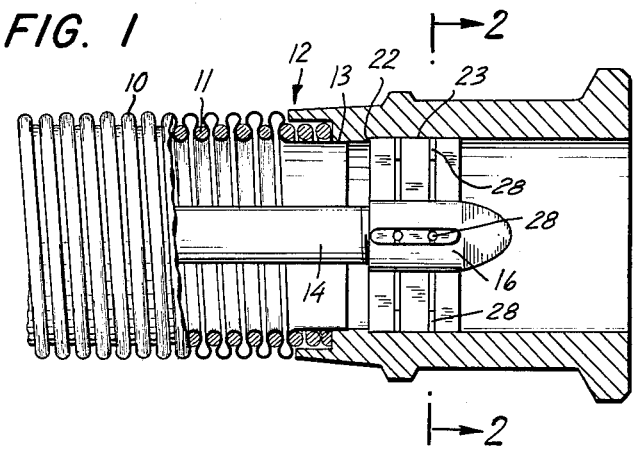
FIGURE 1 is a partially cross-sectioned view of a flexible hose employing one embodiment of the invention.

Thus, as may be seen in FIGURE 1 of such drawing, one form of the present invention is employed in conjunction with a flexible metal hose 10 which is reinforced, according to conventional practice, by a metal coil 11. The hose 10 also communicates with an annular end fitting, generally designated by the numeral 12, said hose being disposed against the internal periphery of said fitting, as at the portion thereof designated by the numeral 13, for example.

Figure 2:
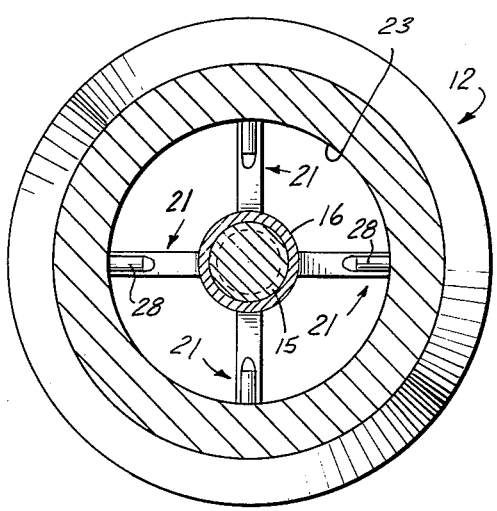
FIGURE 2 is an enlarged elevational view taken about the line 2—2 of FIGURE 1.
Figure 3:
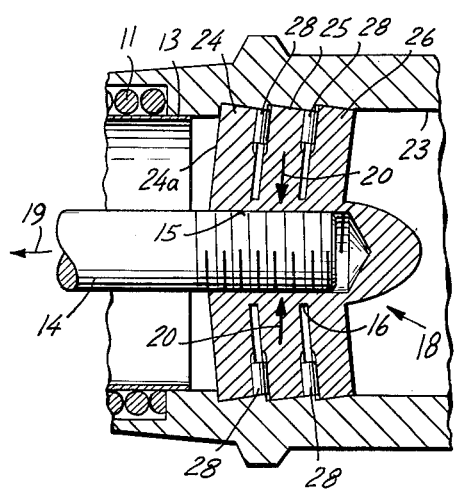
FIGURE 3 is an enlarged cross-sectional view of the aforesaid embodiment of the invention depicting its gripping action upon the cable and the internal periphery of an end fitting of the hose when the cable is subjected to tension.

The hose is provided with a tension member such as an axial cable 14 which, as shown in FIGURES 2 and 3 of the drawing, includes an end portion 15 threadedly engaged with the hollow hub 16 of an anchoring means, generally designated by the numeral 18.

As may be seen in FIGURES 2 and 3, the hollow hub 16 is a thin-walled element. The major diameter of the thread of the axial cable 14 preferably does not exceed the diameter of the unthreaded portion of the axial cable 14 and hence, insofar as the hub 16 which surrounds the end portion 15 of such cable is concerned, there is a minimal interference with fluid flow through the fitting and hose. This advantage results from the fact that when tension is exerted upon the cable 14 in the direction of the arrow 19, for example, the arrangement of the anchoring means is such that the hub 16 will be compressed in the direction of the arrows 20, thereby urging it to grip more firmly the end portion 15 of the axial cable 14. Such a gripping action opposes the possibility of stripping the thread on said end portion 15 and renders unnecessary the use of a raised thread or a very deep thread upon such end portion or other expanded construction thereof which might present a greater obstruction to fluid flow through the hose and which obstruction might be augmented by the necessity for a hub having a greater wall thickness.

Figure 4:
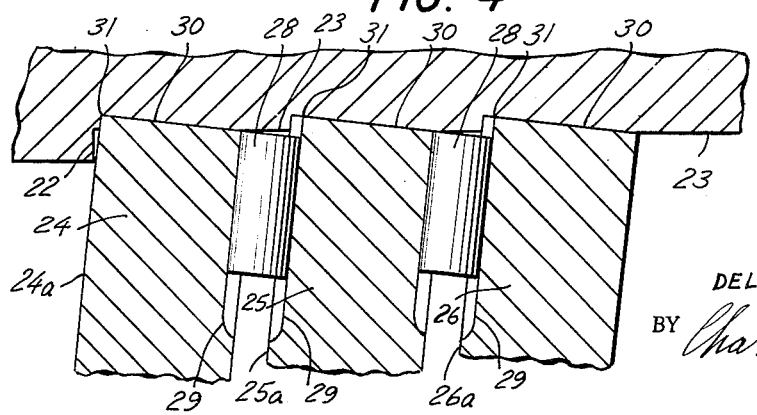
FIGURE 4 is an enlarged fragmentary cross-sectional view of the aforesaid embodiment of the invention depicting its gripping action upon the internal periphery of the said hose fitting.

The gripping action of the hub 16 is effected by a plurality of radial members 21 which depend from the hub 16 and are disposed in contact with an annular shoulder 22 formed upon the internal circumferential periphery 23 of the end fitting 12 (see FIGURES 1 and 4). Here again, it is noteworthy that the smaller the depth of the shoulder 22, the smaller will be the interference with fluid flow through the fitting and the greater will be the cross-sectional area thereof available for such flow through a fitting of any given size.

To permit the use of a shoulder of minimal depth, however, it has been found necessary to supplement the support it affords the radial members 21 by further gripping means. Thus, in the form of the invention here described, tension on the cable 14 is employed to induce the radial members 21 to grip the internal circumferential periphery 23 of the fitting in the manner hereinafter described. This gripping action can be more clearly understood from the following discussion.

The radial members 21 are equiangularly spaced, as for example, at ninety degree intervals, and include a plurality of axially spaced, aligned columns 24, 25 and 26. The spaced relation of these columns is maintained by a plurality of radial pins 28 seated in radial grooves 29 provided upon opposing lateral surfaces of the columns 24, 25 and 26.

These columns are also disposed in a tight contact with the internal circumferential periphery 23 of the fitting 12 and present a substantially planar face 30 thereto which conforms with such internal circumferential periphery 23.

As may be seen in FIGURES 3 and 4 of the drawing, when tension is exerted upon the axial cable 14, the columns 24, 25 and 26 are supported against axial displacement by the shoulder 22 and are subjected to a bending action which urges at least one edge 31 of each of the columns 24, 25 and 26 to engage frictionally or indent the internal circumferential periphery 23 of the fitting thereby seating the columns 24, 25 and 26 upon such periphery 23 or within such indentations so as to resist the tension. The bending action subjects the surfaces 24a, 25a and 26a of the columns to a tensile stress which permits such frictional engagement or indentation; and such bending action also imposes a compressive stress upon the opposing surfaces of the columns which induces the previously described gripping action of the hollow hub 16.

It will be seen that the spacing of the columns accomplished by the pins 28 permit the said frictional engagement or indentations to be accomplished by a plurality of edges 31 of the columns, thereby creating a multiplicity of seats for the columns 24, 25 and 26.

It will also be seen that the anchoring means and associated structures may be formed by conventional equipment and are of inherently sturdy design.

While the form of the invention described above has been discussed in connection with one end fitting, it is to be understood that the cable 14 can be and frequently is, supported by similar anchoring means in an end fitting disposed at the other end of the hose. Moreover, if desired, suitable fittings disposed intermediately of the hose ends and engaged with anchoring means of the kind described may also be employed.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

1. In a hose provided with an axial tension member, the combination comprising:
   (a) an annular member engaged with the periphery of the hose;
   (b) anchoring means including a plurality of radial members disposed in contact with the internal circumferential periphery of the annular member;
   (c) said radial members depending from a hub provided with peripheral means for gripping the tension member;
   (d) each of said radial members including a plurality of columns spaced axially of said hose;
   (e) said axial spacing between adjacent of said columns being maintained by a radially disposed pin seated upon radial surfaces of the adjacent of said columns;
   (f) said columns also being supported upon a shoulder formed upon the internal periphery of the annular member;
   (g) said columns being urged to indent the internal circumferential periphery of the annular member when stress is exerted upon the tension member, thereby seating said columns within the indentations thus formed.

2. In a hose provided with an axial tension member, the combination comprising:
   (a) an annular member engaged with the periphery of the hose;
   (b) anchoring means including a plurality of radial members;
   (c) said radial members depending from a hub provided with peripheral means for gripping the tension member;
   (d) said radial members being angularly spaced;
   (e) each of said radial members including a plurality of columns spaced axially of said hose;
   (f) each of said columns presenting a substantially planar end face to the internal circumferential periphery of the annular member;
   (g) said columns also being provided with a plurality of oppositely disposed depressions;
   (h) said axial spacing between adjacent of said columns being maintained by a radially disposed pin seated within said oppositely disposed depressions;
   (i) said columns also being supported upon a shoulder formed upon the internal circumferential periphery of the annular member;
   (j) the end faces of said columns being urged to indent the internal circumferential periphery of the annular member when stress is exerted upon the tension member, thereby seating said columns within the indentations thus formed.

3. In a flexible metal hose provided with an axial cable for resisting internal pressures within said hose, the combination comprising:
   (a) a pair of annular end fittings engaged with said hose;
   (b) anchoring means associated with each of said annular end fittings;
   (c) each of the anchoring means including a plurality of radial members;
   (d) said radial members depending from a hub disposed axially of said one of said annular end fittings and provided with internal peripheral means for gripping the axial cable;
   (e) said radial members being equiangularly spaced;
   (f) each of said radial members including a plurality of aligned columns spaced axially of said hose;
   (g) each of said columns presenting a substantially planar end face to the internal circumferential periphery of one of said annular end fittings;
   (h) lateral surfaces of said columns being provided with a plurality of oppositely disposed radial grooves;
   (i) said axial spacing between said aligned columns being maintained by radially disposed pins seated within said oppositely disposed radial grooves;
   (j) said columns also being supported upon the internal circumferential periphery of said one of said annular end fittings;
   (k) the radial members being supported upon an annular shoulder formed upon the internal circumferential periphery of said one of said annular end fittings;
   (l) edges of the substantially planar end faces of said columns being urged to indent the internal circumferential periphery of said one of said annular end fittings when tensile stress is exerted upon the axial cable, thereby seating said edges within the indentations thus formed;
   (m) said columns also urging said hub to compress the axial cable when tensile stress is exerted thereon.

References Cited by the Examiner

UNITED STATES PATENTS

| | | | |
|---|---|---|---|
| 2,707,972 | 5/1955 | Cole | 285—114 |
| 2,908,295 | 10/1959 | Beazley | 285—114 |
| 3,074,746 | 1/1963 | Shames | 285—8 |

CARL W. TOMLIN, *Primary Examiner.*

EDWARD C. ALLEN, *Examiner.*

R. A. GIANGIORGI, *Assistant Examiner.*